(12) United States Patent
Liao et al.

(10) Patent No.: US 11,642,876 B2
(45) Date of Patent: May 9, 2023

(54) PLASTIC WRAP AND METHOD FOR MANUFACTURING THE SAME

(71) Applicant: NAN YA PLASTICS CORPORATION, Taipei (TW)

(72) Inventors: Te-Chao Liao, Taipei (TW); Chun-Che Tsao, Taipei (TW); Chen-Ho Lai, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 0 days.

(21) Appl. No.: 17/306,956

(22) Filed: May 4, 2021

(65) Prior Publication Data
US 2022/0055358 A1 Feb. 24, 2022

(30) Foreign Application Priority Data
Aug. 20, 2020 (TW) .................. 109128332

(51) Int. Cl.
*B32B 27/08* (2006.01)
*B32B 27/32* (2006.01)
*B32B 27/30* (2006.01)

(52) U.S. Cl.
CPC ............ *B32B 27/08* (2013.01); *B32B 27/304* (2013.01); *B32B 27/32* (2013.01); *B32B 2250/246* (2013.01); *B32B 2264/1021* (2020.08); *B32B 2264/1022* (2020.08); *B32B 2264/1025* (2020.08)

(58) Field of Classification Search
CPC ....... B32B 27/08; B32B 27/304; B32B 27/32; B32B 2250/246; B32B 2264/1021; B32B 2264/1022; B32B 2264/1025
See application file for complete search history.

(56) References Cited

U.S. PATENT DOCUMENTS

| | | | | |
|---|---|---|---|---|
| 4,798,751 A | * | 1/1989 | Schuetz | B32B 27/30 428/323 |
| 4,977,031 A | * | 12/1990 | Temple | B65D 81/264 428/463 |
| 5,674,618 A | * | 10/1997 | Lee | C08J 5/18 524/789 |
| 2007/0104629 A1 | * | 5/2007 | Yadav | C01F 17/229 977/773 |
| 2018/0362232 A1 | * | 12/2018 | Spigaroli | B32B 27/18 |

FOREIGN PATENT DOCUMENTS

| | | | |
|---|---|---|---|
| CN | 1686762 A | * | 10/2005 |
| CN | 207029964 U | | 2/2018 |
| CN | 107746470 A | | 3/2018 |
| CN | 109912876 A | | 6/2019 |

(Continued)

*Primary Examiner* — Tamra L. Dicus
(74) *Attorney, Agent, or Firm* — Li & Cai Intellectual Property Office (57) ABSTRACT

A plastic wrap and a method for manufacturing the same are provided. The plastic wrap includes at least one resin layer that includes a resin composition. The resin composition includes, based on 100 wt % of the resin composition, 1 to 14 wt % of an inorganic nano powder. The inorganic nano powder includes 1 to 30 wt % of zinc oxide, 1 to 20 wt % of titanium oxide, and at least one of 1 to 35 wt % of a silver salt-doped silicon oxide and 1 to 15 wt % of a rare earth metal salt.

10 Claims, 6 Drawing Sheets

Providing a resin composition — S100

Making the resin composition into a plurality of masterbatches — S102

Forming a resin layer by using the plurality of masterbatches — S104

(56) References Cited

FOREIGN PATENT DOCUMENTS

| | | | | |
|---|---|---|---|---|
| CN | 111269483 | A | 6/2020 | |
| EP | 2145758 | A1 * | 1/2010 | ............ B32B 15/08 |
| GB | 2223446 | A * | 4/1990 | ............ B32B 27/08 |
| JP | 59129785 | U | 8/1984 | |
| JP | 63151451 | A | 6/1988 | |
| JP | 2175140 | A | 7/1990 | |
| JP | 1994022686 | A * | 7/1992 | |
| JP | 3068377 | U | 5/2000 | |
| JP | 2002309025 | A | 10/2002 | |
| JP | 2007510016 | A | 4/2007 | |
| JP | 2013154945 | A | 8/2013 | |
| JP | 2015155527 | A | 8/2015 | |
| JP | 201999785 | A | 6/2019 | |
| KR | 20110025313 | A * | 3/2011 | ............ B32B 27/08 |
| KR | 10-1096735 | B1 * | 12/2011 | |
| TW | 202021807 | A | 6/2020 | |

\* cited by examiner

PLASTIC WRAP AND METHOD FOR MANUFACTURING THE SAME

CROSS-REFERENCE TO RELATED PATENT APPLICATION

This application claims the benefit of priority to Taiwan Patent Application No. 109128332, filed on Aug. 20, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a film and a method for manufacturing the same, and more particularly to a plastic wrap and a method for manufacturing the same that can effectively slow down an aging and decaying process of fruits and vegetables, and preserve the freshness of the fruits and vegetables.

BACKGROUND OF THE DISCLOSURE

A plastic wrap is a plastic packaging product, which is mainly used for food preservation in a refrigerator, heating food in a microwave, packaging for fresh and cooked food, etc., and serves as an essential packaging material for daily preservation of food. The plastic wrap is widely used in supermarkets, households, and industrial manufacturing, and a functionality of the plastic wrap is receiving more and more attention.

Most of the commercially available plastic wraps that are made of polyvinyl chloride (PVC) and polyethylene (PE) can be used to package fruits and vegetables and reduce an effusion of water, but cannot eliminate an aging hormone such as ethylene secreted during a ripening process of the fruits and vegetables, which limits the effect of preserving the freshness of the fruits and vegetables.

In addition, the fruits and vegetables are still living organisms after harvesting, and are susceptible to environmental factors such as temperature and humidity, as well as microbes, which may cause the fruits and vegetables to be spoiled. Accordingly, keeping the fruits and vegetables fresh is quite important. Conventional techniques for keeping the fruits and vegetables fresh include refrigerated storage and modified atmosphere packaging.

The refrigerated storage is relatively simple and easy to implement, but a short shelf life of the fruits and vegetables in fresh produce markets and a decaying of the fruits and vegetables during transportation need a comprehensive improvement.

In terms of the modified atmosphere packaging technology, conventional packaging for the modified atmosphere packaging still has the following problems:

1) During a period when the fruits and vegetables are kept in the packaging for the modified atmosphere packaging, the aging hormone such as ethylene is secreted due to a metabolism of the fruits and vegetables. The aging hormone accumulates in the packaging for the modified atmosphere packaging and cannot escape, resulting in an accelerated aging and decaying of the fruits and vegetables, which is unfavorable for storing and keeping the fruits and vegetables fresh.

2) A resin material used in the packaging for the modified atmosphere packaging has no anti-mold and anti-bacterial effect. Accordingly, a growth of bacteria or mold on the fruits and vegetables tends to occur in a storage process, which results in the decay of the fruits and vegetables.

3) Since various fruits and vegetables may each have a different respiration rate, and various resin materials may each also have a different air permeability, a single resin material cannot be applied to all kinds of the fruits and vegetables. An appropriate gas composition inside the packaging for the modified atmosphere packaging is adjusted by adjusting a density of each of different resin materials, so that the packaging for the modified atmosphere packaging is made of the different resin materials.

4) The conventional packaging for the modified atmosphere packaging may have a multi-layer structure that can be used to keep the fruits and vegetables fresh, but a process of making the same is complicated and costly, and still has room for improvement.

Therefore, providing an improvement of the plastic wrap to overcome the above-mentioned shortcomings has become one of the important issues to be solved in the related field.

SUMMARY OF THE DISCLOSURE

In response to the above-referenced technical inadequacies, the present disclosure provides a plastic wrap and a method for manufacturing the same.

In one aspect, the present disclosure provides a plastic wrap, which includes at least one resin layer. The at least one resin layer includes a resin composition. Based on 100 wt % of the resin composition, the resin composition includes, 1 to 14 wt % of an inorganic nano powder. The inorganic nano powder includes 1 to 30 wt % of zinc oxide, 1 to 20 wt % of titanium oxide, and at least one of 1 to 35 wt % of a silver salt-doped silicon oxide and 1 to 15 wt % of a rare earth metal salt.

In certain embodiments, the silver salt is silver phosphate, silver nitrate, or both, and the zinc oxide is aluminosilicate or silicon oxide. The rare earth metal salt is cerium nitrate or lanthanum acetate.

In certain embodiments, the resin composition further includes 86 to 99 wt % of polyvinyl chloride or 86 to 99 wt % of polyethylene. The at least one resin layer has a plurality of air vents that are uniformly distributed, and the plurality of air vents each has a pore size of 40 to 200 μm.

In certain embodiments, the resin composition further includes 66 to 98 wt % of a first resin and 1 to 20 wt % of a second resin. The first resin is polyvinyl chloride or polyethylene, and the second resin is at least one selected from polypropylene, high density polyethylene, low density polyethylene and linear low density polyethylene.

In certain embodiments, the plastic wrap further includes a water retention layer, and the water retention layer is disposed on the at least one resin layer.

In another aspect, the present disclosure provides a method for manufacturing a plastic wrap, which includes providing a resin composition, making the resin composition into a plurality of plastic masterbatches, and forming at least one resin layer by using the plurality of plastic masterbatches. Based on 100 wt % of the resin composition, the resin composition includes 1 to 14 wt % of an inorganic nano powder. The inorganic nano powder includes 1 to 30 wt % of zinc oxide, 1 to 20 wt % of titanium oxide, and at least one of 1 to 35 wt % of a silver salt-doped silicon oxide and 1 to 15 wt % of a rare earth metal salt.

In certain embodiments, the resin composition further includes 86 to 99 wt % of polyvinyl chloride or 86 to 99 wt % of polyethylene. The method further includes forming a plurality of air vents that are uniformly distributed on the at least one resin layer. The plurality of air vents each has a pore size of 40 to 200 μm.

In certain embodiments, the silver salt is silver phosphate and/or silver nitrate, and the zinc oxide is aluminosilicate or silicon oxide. The rare earth metal salt is cerium nitrate or lanthanum acetate.

In certain embodiments, the resin composition further includes 66 to 98 wt % of a first resin and 1 to 20 wt % of a second resin. The first resin is polyvinyl chloride or polyethylene, and the second resin is selected from at least one of polypropylene, high density polyethylene, low density polyethylene, and linear low density polyethylene.

In certain embodiments, the method further includes forming a water retention layer on a surface of the at least one resin layer.

Therefore, one of the beneficial effects of the present disclosure is that by virtue of "at least one resin layer including a resin composition, the resin composition includes, based on 100 wt % of the resin composition, 1 to 14 wt % of an inorganic nano powder, the inorganic nano powder includes 1 to 30 wt % of zinc oxide, 1 to 20 wt % of titanium oxide, 1 to 35 wt % of a silver salt-doped silicon oxide and/or 1 to 15 wt % of a rare earth metal salt", the plastic wrap provided by the present disclosure, when being applied to various fruits and vegetables, can slow down a process of decaying or aging of the fruits and vegetables and maintain the freshness of the fruits and vegetables.

Another beneficial effect of the present disclosure is that by virtue of "providing a resin composition, the resin composition includes, based on 100 wt % of the resin composition, 1 to 14 wt % of an inorganic nano powder, the inorganic nano powder includes 1 to 30 wt % of zinc oxide, 1 to 20 wt % of titanium oxide, 1 to 35 wt % of a silver salt-doped silicon oxide and/or 1 to 15 wt % of a rare earth metal salt; making the resin composition into a plurality of plastic masterbatches; and forming at least one resin layer by using the plurality of plastic masterbatches", the method for manufacturing the plastic wrap can be combined with the conventional equipment and technology for a plastic film or bag, so that a manufacturing process is simple and easy to implement, and the above-mentioned plastic wrap can be produced industrially in large quantities.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 1:
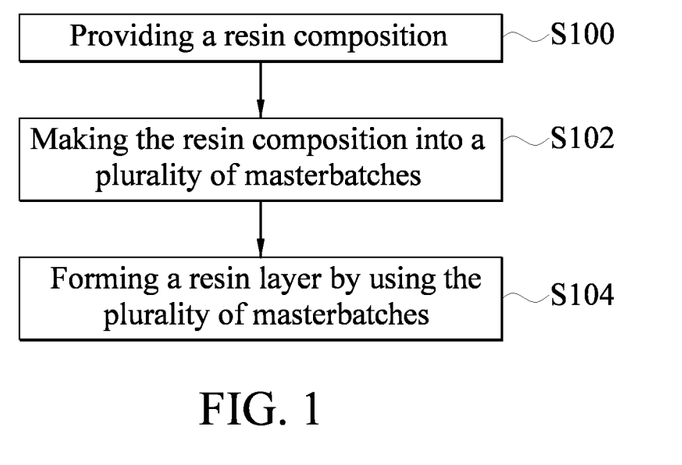
FIG. 1 is a flowchart of a method for manufacturing a plastic wrap according to a first embodiment of the present disclosure.
Figure 2:
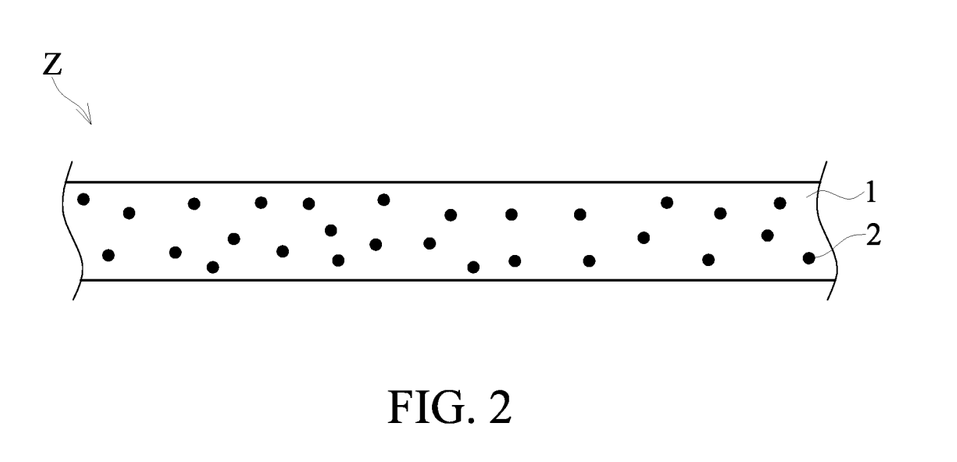
FIG. 2 is a schematic view of a first structure of the plastic wrap according to the first embodiment of the present disclosure.
Figure 3:
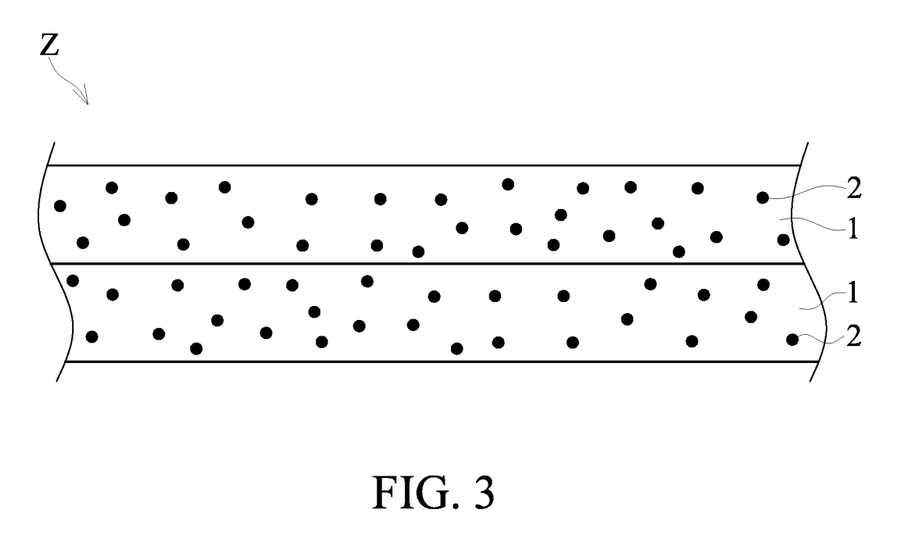
FIG. 3 is a schematic view of a second structure of the plastic wrap according to the first embodiment of the present disclosure.

Reference is made to FIG. 1 to FIG. 3, in which a flowchart of a method for manufacturing a plastic wrap, a schematic view of a first structure of the plastic wrap and a schematic view of a second structure of the plastic wrap according to a first embodiment of the present disclosure are shown, respectively. As shown in the figures, the first embodiment of the present disclosure provides a method for manufacturing a plastic wrap Z, which at least includes the following steps:

a. Providing a resin composition (Step S100). For example, the resin composition of the present disclosure, based on 100 wt % of the resin composition, can include 1 to 14 wt % of an inorganic nano powder 2. In addition, the inorganic nano powder 2 can include 1 to 30 wt % of zinc oxide (ZnO), 1 to 20 wt % of titanium oxide (TiO$_2$), and at least one of 1 to 35 wt % of a silver salt-doped silicon oxide and 1 to 15 wt % of a rare earth metal salt. Furthermore, the silver salt can be silver phosphate or silver nitrate, and the zinc oxide can be aluminosilicate or silicon oxide. The aluminosilicate or the silicon oxide can be modified by using the silver salt in the present disclosure. The rare earth metal salt can be cerium nitrate or lanthanum acetate, but is not limited thereto.

b. Making the resin composition into a plurality of plastic masterbatches (Step S102). That is, the resin composition can be made into the plurality of plastic masterbatches using an extruder or the like.

c. Forming at least one resin layer 1 by using the plurality of plastic masterbatches (Step S104). For example, referring to FIG. 1 and FIG. 2, the above described plastic masterbatches are made into the resin layer 1 by film blowing or casting using a plastic film equipment. The resin layer 1 can have a thin film structure and have a thickness of 1.2 to 35 µm. The inorganic nano powder 2 is dispersed in the resin layer 1.

Therefore, through the above-mentioned technical solution, the inorganic nano powder 2 is introduced into the resin layer 1, so that the resin layer 1 (i.e., the plastic wrap Z) can absorb an aging hormone secreted by fruits and vegetables after the fruits and vegetables are packaged with the resin layer 1, thereby effectively slowing down the aging of the fruits and vegetables, reducing a degree of decaying of the fruits and vegetables, and keeping a freshness and a vibrant color of the fruits and vegetables. In addition, the inorganic nano powder 2 has an anti-mold and an anti-bacterial effect due to the inorganic nano powder 2 including nano oxides such as zinc oxide, so that a clean storage environment for the fruits or the vegetables can be effectively maintained, and a growth of bacteria and mold on the fruits and vegetables can be prevented to maintain the vibrant color and nutrition of the fruits and vegetables.

In addition, as shown in FIG. 1 to FIG. 3, the resin layer 1 produced by the above method can have a single-layer structure (as shown in FIG. 2) or a multi-layer structure (as shown in FIG. 3).

Furthermore, according to the above description, the present disclosure also provides the plastic wrap Z that includes at least one of the resin layer 1. The at least one of the resin layer 1 includes the resin composition, which includes, based on 100 wt % of the resin composition, 1 to 14 wt % of the inorganic nano powder 2. The inorganic nano powder 2 includes 1 to 30 wt % of zinc oxide, 1 to 20 wt % of titanium oxide, 1 to 35 wt % of the silver salt-doped silicon oxide and/or 1 to 15 wt % of the rare earth metal salt.

However, the aforementioned description of the method for manufacturing the plastic wrap of the first embodiment is merely an example and is not meant to limit the scope of the present disclosure.

Second Embodiment

Figure 4:
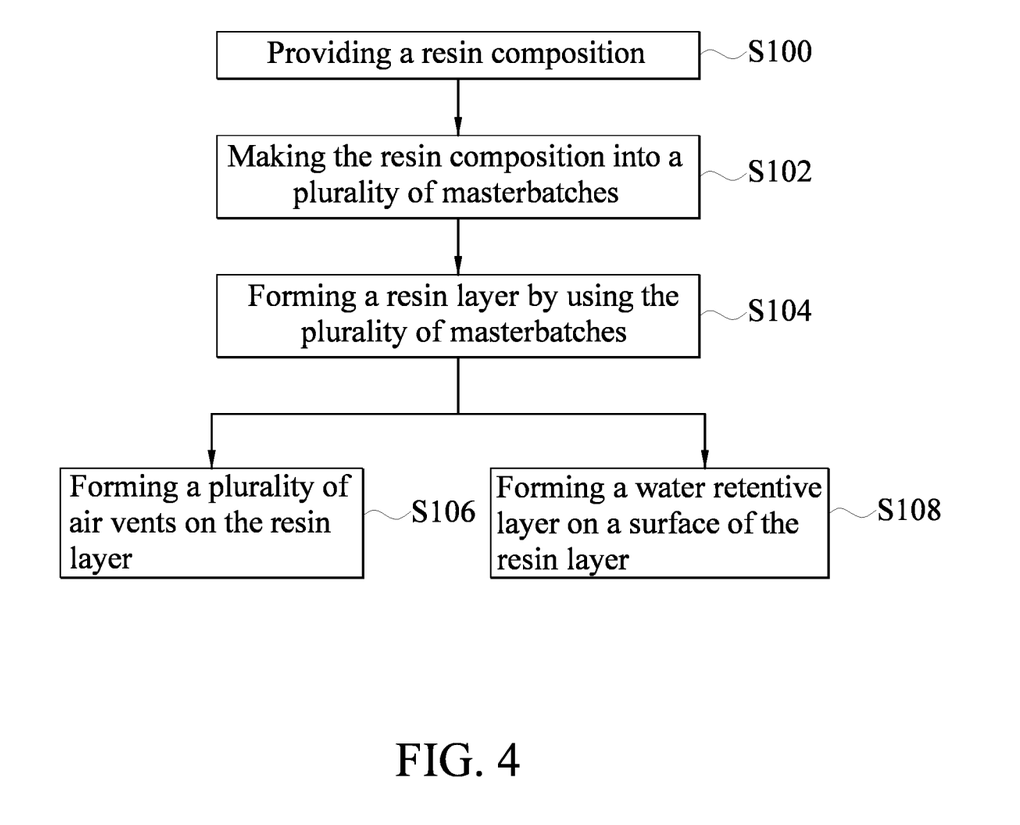
FIG. 4 is a flowchart of a method for manufacturing a plastic wrap according to a second embodiment of the present disclosure.
Figure 5:
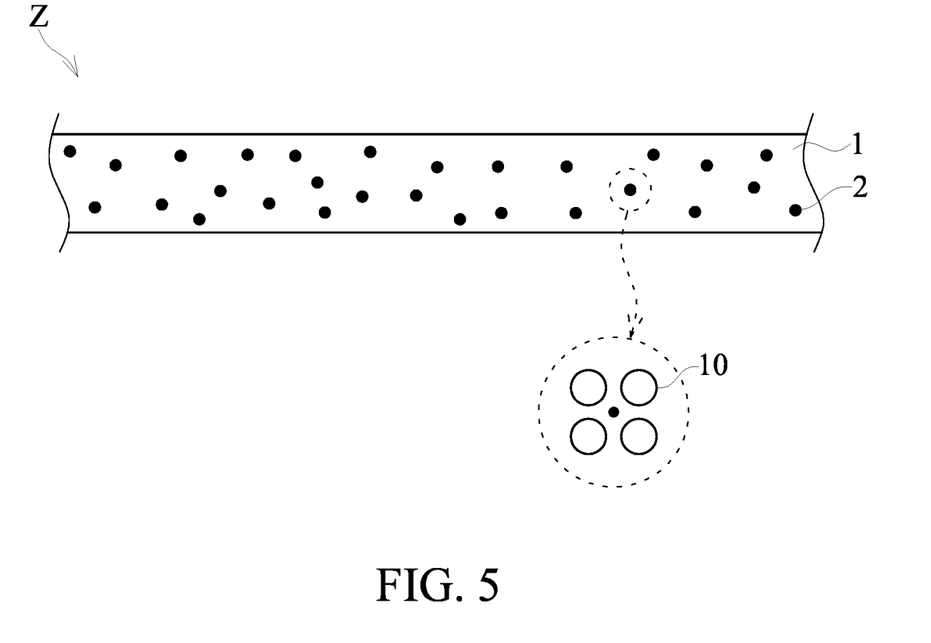
FIG. 5 is a schematic view of a first structure of the plastic wrap according to the second embodiment of the present disclosure.
Figure 6:
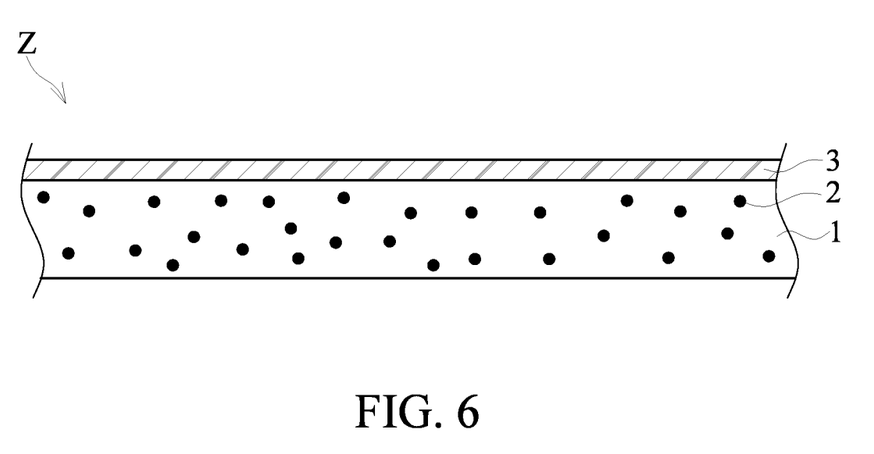
FIG. 6 is a schematic view of a second structure of the plastic wrap according to the second embodiment of the present disclosure.

Reference is made to FIG. 4 to FIG. 6, in which a flowchart of a method for manufacturing a plastic wrap, a schematic view of a first structure of the plastic wrap, and a schematic view of a second structure of the plastic wrap according to a second embodiment of the present disclosure are shown, respectively. As shown in the figures, the method for manufacturing the plastic wrap Z of the present disclosure further includes:

d. Forming a plurality of air vents 10 on at the least one of the resin layer 1 (Step S106).

For example, as shown in FIG. 4 and FIG. 5, the resin composition can further include 86 to 99 wt % of polyvinyl chloride (PVC) or 86 to 99 wt % of polyethylene (PE). In addition, after the resin layer 1 is made by the aforementioned method, the plurality of air vents 10 can be formed and uniformly distributed on the resin layer 1 by a process of laser drilling, and the plurality of air vents 10 each has a pore size of 40 to 200 µm. Accordingly, the plastic wrap Z of the present disclosure can adjust an air permeability of the resin layer 1 (i.e., the plastic wrap Z) through the plurality of the air vents, so as to be suitable for different types of fruits or vegetables with different respiration rates, thereby expanding an applicability to different types of the fruits and vegetables, and a fresh preservation effect.

It should be noted that, in another embodiment, the above-mentioned technical effect of regulating the air permeability of the resin layer 1 can also be achieved by adding different types of resins in the plastic wrap Z of the present disclosure. Furthermore, the resin composition of the present disclosure can further include 66 to 98 wt % of a first resin and 1 to 20 wt % of a second resin. The first resin can be polyvinyl chloride (PVC) or polyethylene (PE). The second resin can include 1 to 20 wt % of polypropylene (PP), 1 to 20 wt % of high density polyethylene (HDPE), 1 to 20 wt % of low density polyethylene (LDPE) and/or 1 to 20 wt % of linear low density polyethylene (LLDPE). Therefore, in the present disclosure, the molded resin layer 1 has a porous characteristic by adding the second resin into the first resin.

Further, the method for manufacturing the plastic wrap Z of the present disclosure can further include the following step:

e. Forming a water retention layer 3 on a surface of the at least one of the resin layer 1 (Step S108).

For example, as shown in FIG. 4 and FIG. 6, by forming at least one of the water retention layer 3 on the surface of the resin layer 1, a water evaporation of the fruits and vegetables can be reduced, which provides a moisturizing effect to the plastic wrap Z. Accordingly, a water loss that causes the decaying of the fruits and vegetables can be prevented, and a texture of the fruits and vegetables can be maintained, thereby effectively extending a fresh preservation period of the fruits and vegetables and keeping the fruits and vegetables crispy. The water retention layer 3 can be selected from at least one of modified starch, polyacrylic acid, polyethylene glycol, polyacrylamide, a cellulose derivative, xanthan gum, and chitosan. The plastic wrap Z including the water retention layer 3 has a thickness of 5 to 40 µm.

In addition, in another embodiment, the resin composition of the present disclosure can further include 0.1 to 5.0 wt % of a preservative. The preservative can include 88.9 wt % of an activated carbon or a silicate molecular sieve with a porous structure, 0.1 wt % of sorbic acid and a salt thereof, 1.0 wt % of chitosan, 10.0 wt % of zinc or a copper salt, etc. The preservative can be dispersed in the resin layer 1, or be formed on a surface of the resin layer 1 that is in contact with the fruits or the vegetables. Accordingly, by adding the preservative to the plastic wrap Z of the present disclosure, effects of removing the aging hormone that causes the aging of the fruits or the vegetables in the storage environment, preventing food from decaying, reducing an oxygen content in the package, and the anti-mold and the anti-bacterial effect can be achieved. A weight ratio of the resin material (i.e., polyvinyl chloride, polyethylene, or the first resin as well as the second resin) to the inorganic nano powder 2 is 6.14 to 99.00.

However, the aforementioned description of the method for manufacturing the plastic wrap of the first embodiment is merely an example and is not meant to limit the scope of the present disclosure.

The following are practical experimental data of the plastic wrap Z of the present disclosure that can absorb the aging hormone and a commercially available plastic wrap.

Experimental Example 1

Testing item: chlorophyll.
Testing food: spoon cabbage.
Testing environment: 5° C. refrigeration.

In terms of a degradation degree of the chlorophyll, which is to be read in conjunction with the following table, a result shows that a decline in the degradation degree of the chlorophyll of the spoon cabbage covered with the plastic wrap Z of the present disclosure that can absorb the aging hormone is significantly slower compared to that of the commercially available plastic wrap. That is, the plastic wrap Z of the present disclosure is helpful in slowing down the aging of the vegetable and a loss of nutrients.

| Item | Packaging material | Storage temperature | Chlorophyll degradation degree | | |
|------|--------------------|---------------------|--------|--------|--------|
|      |                    |                     | Day 1 | Day 5 | Day 10 |
| 1 | Plastic wrap Z of the present disclosure | 5° C. | 0.00% | −1.86% | −3.76% |
| 2 | Commercially available plastic wrap | 5° C. | 0.00% | −3.52% | −8.24% |

Experimental Example 2

Testing item: $O_2$ concentration inside packaging materials.
Testing food: spoon cabbage.
Testing environment: 5° C. refrigeration.

In terms of a decrease of the $O_2$ concentration inside the packaging material, which is to be read in conjunction with the following table, a result shows that the plastic wrap Z of the present disclosure that can absorb the aging hormone is helpful in reducing the $O_2$ concentration inside the package compared to that of the commercially available plastic wrap, and accordingly the plastic wrap Z of the present disclosure that can absorb the aging hormone inhibits a respiration of the fruits and vegetables and slows down the aging of the fruits and vegetables.

| Item | Packaging material | Storage temperature | $O_2$ concentration (%) | | |
|------|--------------------|---------------------|--------|--------|--------|
|      |                    |                     | Day 1 | Day 5 | Day 10 |
| 1 | Plastic wrap Z of the present disclosure | 5° C. | 20.80 | 19.92 | 19.53 |
| 2 | Commercially available plastic wrap | 5° C. | 20.80 | 20.26 | 20.09 |

Experimental Example 3

Testing item: $CO_2$ concentration inside packaging materials.
Testing food: spoon cabbage.
Testing environment: 5° C. refrigeration.

In terms of a decrease of the $CO_2$ concentration inside the packaging material, which is to be read in conjunction with the following table, a result shows that the plastic wrap Z of the present disclosure that can absorb the aging hormone is helpful in increasing the $CO_2$ concentration inside the package compared to that of the commercially available plastic wrap, which further strengthens the aforementioned experimental example 2 where the $O_2$ concentration is reduced, and accordingly the plastic wrap Z of the present disclosure that can absorb the aging hormone inhibits the respiration of the fruits or the vegetables and has an effect for extending the fresh preservation effect.

| Item | Packaging material | Storage temperature | $CO_2$ concentration (%) | | |
|------|--------------------|---------------------|--------|--------|--------|
|      |                    |                     | Day 1 | Day 5 | Day 10 |
| 1 | Plastic wrap Z of the present disclosure | 5° C. | 0.10 | 0.65 | 0.89 |
| 2 | Commercially available plastic wrap | 5° C. | 0.10 | 0.43 | 0.59 |

Experimental Example 4

Testing item: ethylene concentration inside packaging materials.
Testing food: spoon cabbage.
Testing environment: 5° C. refrigeration.

In terms of the ethylene concentration inside the packaging material, which is to be read in conjunction with the following table, a result shows that the plastic wrap Z of the present disclosure that can absorb the aging hormone has an effect of absorbing the ethylene secreted from the fruits and vegetables during a metabolic process of the fruits and vegetables compared to that of the commercially available plastic wrap, so that the effect of slowing down the aging of the fruits or the vegetables can be achieved.

| Item | Packaging material | Storage temperature | Ethylene concentration (ppm) | | |
|------|--------------------|---------------------|--------|--------|--------|
|      |                    |                     | Day 1 | Day 5 | Day 10 |
| 1 | Plastic wrap Z of the present disclosure | 5° C. | 0.0 | 0.0 | 0.0 |
| 2 | Commercially available plastic wrap | 5° C. | 0.0 | 0.4 | 0.9 |

Experimental Example 5

Testing item: food color saturation.
Testing food: spoon cabbage.
Testing environment: 5° C. refrigeration.

In terms of the food color saturation, which is to be read in conjunction with the following table, a result shows that a decrease in the food color saturation of the spoon cabbage packed with the plastic wrap Z of the present disclosure that can absorb the aging hormone is significantly less compared to that of the commercially available plastic wrap, so that a better appearance of the fruits and vegetables can be maintained.

| Item | Packaging material | Storage temperature | Food color saturation | | |
|---|---|---|---|---|---|
| | | | Day 1 | Day 5 | Day 10 |
| 1 | Plastic wrap Z of the present disclosure | 5° C. | 79.03 | 76.15 | 74.56 |
| 2 | Commercially available plastic wrap | 5° C. | 79.58 | 73.62 | 70.24 |

Experimental Example 6

Testing item: hue angle.
Testing food: spoon cabbage.
Testing environment: 5° C. refrigeration.

As shown in the following table, a result shows that the hue angle of the plastic wrap Z of the present disclosure that can absorb the aging hormone and the commercially available plastic wrap each decreases over time, but the plastic wrap Z of the present disclosure that can absorb the aging hormone can slow down the process of decaying of the vegetables and cause a smaller change of the hue angle compared to that of the commercially available plastic wrap, which strengthens the result of the experimental example 5 where the food color saturation is tested. The vegetables covered with the plastic wrap Z of the present disclosure that can absorb the aging hormone have a better appearance.

| Item | Packaging material | Storage temperature | Hue angle | | |
|---|---|---|---|---|---|
| | | | Day 1 | Day 5 | Day 10 |
| 1 | Plastic wrap Z of the present disclosure | 5° C. | 112.10 | 110.21 | 108.53 |
| 2 | Commercially available plastic wrap | 5° C. | 112.07 | 106.16 | 102.93 |

Beneficial Effects of the Embodiments

In conclusion, one of the beneficial effects of the present disclosure is that by virtue of "at least one resin layer 1 including a resin composition, the resin composition includes, based on 100 wt % of the resin composition, 1 to 14 wt % of an inorganic nano powder 2; the inorganic nano powder 2 includes 1 to 30 wt % of zinc oxide, 1 to 20 wt % of titanium oxide, 1 to 35 wt % of a silver salt-doped silicon oxide and/or 1 to 15 wt % of a rare earth metal salt", the plastic wrap provided by the present disclosure can slow down a process of decaying or aging of the fruits and vegetables and preserve the freshness of the fruits and vegetables.

Another beneficial effect of the present disclosure is that by virtue of "providing a resin composition, the resin composition includes, based on 100 wt % of the resin composition, 1 to 14 wt % of an inorganic nano powder 2, the inorganic nano powder 2 includes 1 to 30 wt % of zinc oxide, 1 to 20 wt % of titanium oxide, 1 to 35 wt % of a silver salt-doped silicon oxide and/or 1 to 15 wt % of a rare earth metal salt; making the resin composition into a plurality of plastic masterbatches; and forming at least one resin layer 1 by using the plurality of plastic masterbatches", the method for manufacturing the plastic wrap Z can be combined with the conventional equipment and technology for a plastic film or bag, so that the process is simple and easy to implement, and the above-mentioned plastic wrap can be produced industrially in large quantities.

Further, in order to overcome the above-referenced technical inadequacies, the plastic wrap Z of the present disclosure improves the shortcomings of the general plastic wraps and enhances a fresh-keeping performance. The present disclosure provides the plastic wrap Z and the method for manufacturing the same to solve the problems of the conventional plastic wraps including an inability to inhibit the aging hormone secretion by the fruits and vegetables during the metabolism of the fruits and vegetables, the lack of the anti-mold and the anti-bacterial effect that causes the accelerated rot of the fruits and vegetables, the inability to be applied to the fruits and vegetables with different respiration rates, and a complicated and costly process of a multi-layer packaging material. Through the above technical solution, the inorganic nano powder 2 is introduced into the resin composition, so that the aging of the fruits and vegetables can be effectively slowed down and the process of decaying of the fruits and vegetables can be reduced, thereby maintaining the freshness and the vibrant color of the fruits and vegetables. Moreover, the presence of zinc oxide in the plastic wrap Z renders the plastic wrap Z with the anti-mold and the anti-bacterial effect, so that the clean storage environment for the fruits or vegetables can be effectively maintained, and a growth of bacteria and mold on the fruits and vegetables can be prevented to maintain the vibrant color and the nutrition of the fruits and vegetables. Therefore, the composition and the ratio of the inorganic nano powder 2 can be adjusted according to the type or the respiration rate of the fruits and vegetables, so that a gas composition inside the plastic wrap Z can be regulated when the plastic wrap Z covers the fruits and vegetables, thereby achieving the effect of inhibiting the respiration of the fruits and vegetables and slowing down the aging of the fruits and vegetables.

In addition, the plastic wrap Z of the present disclosure can also use a functional film (i.e., the water retention layer 3) to reduce the water evaporation of the fruits and vegetables, thereby providing the moisturizing effect to the plastic wrap Z. Accordingly, the water loss of the fruits and vegetables that causes the decaying of the fruits and vegetables can be prevented, and the taste of the fruits and vegetables can be maintained, thereby effectively extending the fresh-keeping period of the fruits and vegetables and keeping the fruits and vegetables crispy. Furthermore, the plastic wrap Z of the present disclosure can adjust an air permeability of the plastic wrap Z through an introduction of different types of the second resin into the first resin or the plurality of the air vents formed by the process of laser drilling, so as to be suitable for different types of fruits or vegetables with different respiration rates, thereby expanding the applicability to different types of the fruits or the vegetables, the practical application, and the fresh-keeping effect. Furthermore, the method for manufacturing the plastic wrap Z of the present disclosure can be combined with the conventional equipment and technology for the plastic film or bag, so that the process is simple and easy to implement, and has high value in industrial application.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A plastic wrap, comprising:
at least one resin layer including a resin composition;
wherein based on 100 wt % of the resin composition, the resin composition includes 1 to 14 wt % of an inorganic nano powder, the inorganic nano powder including 1 to 30 wt % of zinc oxide, 1 to 20 wt % of titanium oxide, and at least one of 1 to 35 wt % of a silver salt-doped silicon oxide and 1 to 15 wt % of a rare earth metal salt;
wherein the resin composition further includes 66 to 98 wt % of a first resin and 1 to 20 wt % of a second resin to form the resin layer with a porous characteristic.

2. The plastic wrap according to claim 1, wherein the silver salt is silver phosphate or silver nitrate, and the rare earth metal salt is cerium nitrate or lanthanum acetate.

3. The plastic wrap according to claim 1, wherein the at least one resin layer has a plurality of air vents that are uniformly distributed, and the plurality of air vents each has a pore size of 40 to 200 μm.

4. The plastic wrap according to claim 1, wherein the first resin is polyvinyl chloride or polyethylene, the second resin is at least one selected from polypropylene, high density polyethylene, low density polyethylene, and linear low density polyethylene.

5. The plastic wrap according to claim 1, further comprising a water retention layer, which is disposed on a surface of the at least one resin layer.

6. A method for manufacturing a plastic wrap, comprising:
providing a resin composition; wherein the resin composition includes, based on 100 wt % of the resin composition, 1 to 14 wt % of an inorganic nano powder, the inorganic nano powder including 1 to 30 wt % of zinc oxide, 1 to 20 wt % of titanium oxide, and at least one of 1 to 35 wt % of a silver salt-doped silicon oxide and 1 to 15 wt % of a rare earth metal salt;
making the resin composition into a plurality of plastic masterbatches; and
forming at least one resin layer by using the plurality of plastic masterbatches;
wherein the resin composition further includes 66 to 98 wt % of a first resin and 1 to 20 wt % of a second resin to form the resin layer with a porous characteristic.

7. The method according to claim 6, wherein the method further includes:
forming a plurality of air vents that are uniformly distributed on the at least one resin layer, the plurality of air vents each having a pore size of 40 to 200 μm.

8. The method according to claim 6, wherein the silver salt is silver phosphate or silver nitrate, and the rare earth metal salt is cerium nitrate or lanthanum acetate.

9. The method according to claim 6, wherein the first resin is polyvinyl chloride or polyethylene, the second resin is selected from at least one of polypropylene, high density polyethylene, low density polyethylene, and linear low density polyethylene.

10. The method according to claim 6, further comprising:
forming a water retention layer on a surface of the at least one resin layer.

* * * * *